United States Patent
Buelt et al.

[11] Patent Number: 6,105,981
[45] Date of Patent: Aug. 22, 2000

[54] ADJUSTABLE STEERING AXLE, TRAILER, AND METHOD FOR OPERATING A TRAILER

[76] Inventors: Kenneth H. Buelt, 3605 E. Hamilton, Wausau, Wis. 54403; Brian E. Spencer, 3220 Superior St., Lincoln, Nebr. 65804; John Zientara, 903 - 25th St., Wausau, Wis. 54403; Michael Campbell, 2942 Verle Ave., Ann Arbor, Mich. 48108; John C. Bojarski, 6366 Paynes Point Rd., Neenah, Wis. 54956

[21] Appl. No.: 08/973,813

[22] PCT Filed: Jun. 24, 1997

[86] PCT No.: PCT/US97/11017

§ 371 Date: Aug. 3, 1998

§ 102(e) Date: Aug. 3, 1998

[87] PCT Pub. No.: WO97/49597

PCT Pub. Date: Dec. 31, 1997

Related U.S. Application Data

[60] Provisional application No. 60/020,053, Jun. 24, 1996.

[51] Int. Cl.$^7$ ................................................ B62D 17/00
[52] U.S. Cl. ...................... 280/86.751; 301/132; 280/790
[58] Field of Search .................... 280/86.751, 86.757, 280/426, 89, 790, 442; 301/127, 131, 132

[56] References Cited

U.S. PATENT DOCUMENTS

| | | |
|---|---|---|
| D. 304,360 | 10/1989 | Curry . |
| 1,524,136 | 1/1925 | Kapferer et al. . |
| 1,712,063 | 5/1929 | Agramonte . |
| 2,083,049 | 6/1937 | Byron . |
| 2,498,779 | 2/1950 | Winchester . |
| 2,644,697 | 7/1953 | Peterson . |
| 2,674,463 | 4/1954 | Peterson . |
| 2,674,464 | 4/1954 | Peterson . |
| 2,734,754 | 2/1956 | Barker . |
| 3,108,821 | 10/1963 | Krauss . |
| 3,149,858 | 9/1964 | Gilbert . |
| 3,211,467 | 10/1965 | Siddall . |
| 3,337,234 | 8/1967 | Ishizuka . |
| 3,734,538 | 5/1973 | Humes . |

(List continued on next page.)

FOREIGN PATENT DOCUMENTS

| | | |
|---|---|---|
| 999894 | 11/1976 | Canada . |
| 1108203 | 9/1981 | Canada . |
| 1143406 | 3/1983 | Canada . |
| 1195357 | 10/1985 | Canada . |
| 1199657 | 1/1986 | Canada . |
| 179851 | 1/1976 | New Zealand . |
| 2 245 235 | 1/1992 | United Kingdom . |

OTHER PUBLICATIONS

Elliott, B. G. et al., "The Gasoline Automobile," *Engineering Education Series*, Fifth Edition, pp. 540–542 (1939).
"The Sure Steer Tow Dollie" brochure, *Sure Steel Axle Co.*, 4 pgs. (undated).

*Primary Examiner*—Richard M. Camby
*Assistant Examiner*—Avraham H. Lerner
*Attorney, Agent, or Firm*—Merchant & Gould P.C.

[57] ABSTRACT

An adjustable steering axle includes an outer axle having an exterior surface and an inner cylindrical surface. The inner axle has an outer cylindrical surface, a first kingpin receiving tube provided at a first end of the inner axle and a second kingpin receiving tube at a second end of the inner axle. The inner axle is rotatably received within the cylindrical surface of the outer axle. A first kingpin extends through the first kingpin receiving tube, and a second kingpin extends through a second kingpin receiving tube. A first spindle is rotatably mounted about the first kingpin, and a second spindle is rotatably mounted about the second kingpin. A caster charge pin is attached to the inner axle and provides rotation of the inner axle relative to the outer axle. The adjustable steering axle is desirably used on semi trailers.

18 Claims, 11 Drawing Sheets

U.S. PATENT DOCUMENTS

| | | |
|---|---|---|
| 3,756,646 | 9/1973 | Gimlett et al. . |
| 3,879,051 | 4/1975 | Kolbe . |
| 3,880,439 | 4/1975 | Wolter . |
| 3,899,188 | 8/1975 | Curry . |
| 4,084,833 | 4/1978 | Mohrbacker et al. . |
| 4,162,082 | 7/1979 | Curry . |
| 4,345,775 | 8/1982 | Merrifield . |
| 4,405,147 | 9/1983 | Horsman et al. . |
| 4,451,058 | 5/1984 | Curry . |
| 4,463,966 | 8/1984 | Stoddard . |
| 4,752,080 | 6/1988 | Rogers ................................. 280/426 |
| 4,770,430 | 9/1988 | Lange . |
| 4,792,148 | 12/1988 | Hintz . |
| 4,824,135 | 4/1989 | McGregor . |
| 4,988,115 | 1/1991 | Steinke . |
| 5,011,177 | 4/1991 | Grice . |
| 5,015,004 | 5/1991 | Mitchell . |
| 5,035,439 | 7/1991 | Petrillo . |
| 5,197,786 | 3/1993 | Eschenburg . |
| 5,244,226 | 9/1993 | Bergh . |
| 5,269,546 | 12/1993 | Pollock et al. . |
| 5,316,332 | 5/1994 | Ingalls . |
| 5,320,376 | 6/1994 | Bojarski et al. . |
| 5,326,128 | 7/1994 | Cromley, Jr. . |
| 5,364,113 | 11/1994 | Goertzen . |
| 5,366,059 | 11/1994 | Demong . |
| 5,438,515 | 8/1995 | Miichi et al. . |
| 5,474,320 | 12/1995 | Bojarski ................................. 280/442 |
| 5,620,194 | 4/1997 | Keeler et al. . |

ADJUSTABLE STEERING AXLE, TRAILER, AND METHOD FOR OPERATING A TRAILER

This application claims priority to U.S. Provisional Patent Application Ser. No. 60/020,053, which was filed on Jun. 24, 1996, the entire disclosure of which is incorporated herein by reference.

FIELD OF THE INVENTION

The invention relates to an adjustable steering axle, a trailer which includes an adjustable steering axle, and a method for operating a trailer including an adjustable steering axle. More particularly, the invention relates to an adjustable steering axle which is adjustable between a positive caster position and a negative caster position and which allow the wheels to turn in the desired direction to improve maneuverability.

BACKGROUND OF THE INVENTION

The trucking industry has grown considerably over the years. In order to handle the increased volume and capacity demanded of the trucking industry, trailers have been lengthened and payloads have been increased. Longer trailers have resulted in wider turns and larger swept areas, particularly in the case of right hand turns. In many urban areas, the roads and terminals were designed for much smaller trailers. On many trailers having increased payloads, the axles have been spread apart for better weight distribution and to satisfy bridge laws. The spread axle configuration is conventionally seen on flatbed, drop deck trailers, and refrigerated (reefer) trailers because of the concentrated load conditions. The spread axle configuration offers another advantage in that it provides a smoother ride, more stable platform, and better handling compared with closed tandem trailers. However, the spread axle configuration includes several drawbacks. In particular, because the axles are spread up to about ten feet, maneuverability suffers. In addition, tire wear and maintenance costs are increased. As the turning radius and stress on the trailer increases, more pressure is put on wheel bearings and suspension components, and the tires are often forced to scuff on a road surface. Flatbed trailers and refrigerator trailers are generally the only types of trailers having sufficient structural support to withstand the stresses associated with the conventional spread axle configuration.

Because of the increased length of trailers and the use of spread axles, truckers often get into stressful situations. In addition, when the trailers travel over curbs or outside their proper lane, damage to property and personal injury often result. For example, trailers often damage sign posts and traffic lights, and by jumping the curb, the cargo within the trailer can break. Furthermore, a trailer jumping a curb can injure people standing on the curb.

Steering axles have been developed. In the case of cement mixing trucks and dump trucks, steering axles have been developed for providing a load bearing axle. A problem associated with many prior steering axles is encountered when backing up. The steering wheels will follow the wheels of a tow vehicle when the tow vehicle is moving in the forward direction. When the tow vehicle backs up, the steering wheels of the trailer turn the wrong way, thereby jackknifing the trailer and the tow vehicle. In order to maneuver certain cement mixing trucks and dump trucks, however, the steering axle must be lifted off the ground which defeats the purpose of having a load bearing axle. Previous attempts at trailer steering devices can be seen in U.S. Pat. No. 2,498,779 to Winchester, U.S. Pat. No. 4,405,147 to Horseman et al., and U.S. Pat. No. 4,463,966 to Stoddard, and U.S. Pat. No. 4,770,430 to Lange.

BRIEF DESCRIPTION OF THE DRAWINGS

In the drawings, in which like reference numerals indicate corresponding parts or elements of preferred embodiments of the present invention throughout the several views.

SUMMARY OF THE INVENTION

An adjustable steering axle is provided by the invention. The adjustable steering axle includes an outer axle having an exterior surface and an inner cylindrical surface. The inner axle has an outer cylindrical surface, a first kingpin receiving tube provided at a first end of the inner axle and a second kingpin receiving tube at a second end to the inner axle. The inner axle is rotatably received within the cylindrical surface of the outer axle. A first kingpin extends through the first kingpin receiving tube, and a second kingpin extends through second kingpin receiving tube. A first spindle is rotatably mounted about the first kingpin, and a second spindle is rotatably mounted about the second kingpin. A caster change pin is attached to the inner axle and provides rotation of the inner axle relative to the outer axle.

Semi trailers are provided by the claimed invention. The semi trailers advantageously include a frame, a suspension, and an adjustable steering axle.

The present invention is additionally directed to a method for operating a trailer having an adjustable steering axle. The method includes a step of pulling trailer, wherein the trailer includes, as an axle thereof, an adjustable steering axle.

The present invention is additionally directed to a method for assembling an adjustable steering axle. The method for assembling the adjustable steering axle includes steps of providing an inner axle tube having first and second ends; winding filament around the inner axle tube to provide a filament wound inner axle tube; inserting said filament wound inner axle tube into an outer axle tube; and rotatably attaching first and second spindle assemblies to the first and second ends of the inner axle.

DETAILED DESCRIPTION OF THE PREFERRED EMBODIMENT

The invention is directed to an adjustable steering axle. A steering axle is an axle which allow the wheels on the axle to turn. For example, the wheels on a steering axle will turn as the axle moves around a corner. It should be appreciated that the term "turn" refers to the angular movement of the wheels relative to the vehicle frame and not to the rotation of the wheel about an axis. In contrast, a fixed axle provides wheels which are arranged at about right angle to the axle and which essentially remain at right angle when the axle moves around a corner. Most commercially available semi-trailer have fixed axles. Because the steering axle of the invention is adjustable, it can provide steering in both the forward and reverse directions. That is, the wheels on the adjustable steering axle follow the wheels on a leading fixed axle when traveling in a forward direction, and lead the fixed axle when traveling in a reverse direction. It is expected that a steering axle which is not adjustable can only provide steering in one direction, and will not function properly when directed in the opposite direction.

It should be appreciated that the adjustable steering axle of the invention is particularly well suited for application to a semi-trailer having a spread axle configuration. In situations where the adjustable steering axle is used in a spread axle configuration, it is preferred that the axle located second to last on the trailer will be a fixed axle and that the last axle on the trailer will be the adjustable steering axle. Similarly, if a closed tandem configuration is used, it is expected that the second to last axle provided in a tandem configuration will be a fixed axle and the last axle will be an adjustable steering axle. Of course, it will be apparent from the following description that additional configurations may be practiced and that the adjustable steering axle has applications to vehicles other than semi-trailers.

The wheels on the adjustable steering axle of the invention can follow the wheels on a tow vehicle moving in the forward direction because the wheels on the adjustable steering axle can be adjusted between a positive caster position and a negative caster position which cause the wheels to turn in the intended direction. A positive caster position refers to the arrangement where the steering wheels of the trailer follow the steering wheels of the tow vehicle when the tow vehicle is moving forward. Likewise, a negative caster position refers to the arrangement where the steering wheels of the trailer lead the wheels of the fixed axle when the tow vehicle moves in a reverse direction. The importance of providing positive and negative caster positions is described in detail in U.S. Pat. No. 5,474,320 to Bojarski et al., the entire disclosure of which is incorporated herein by reference. It is an advantage of the invention that the adjustment between a positive caster position and a negative caster position can be accomplished automatically.

Figure 1:
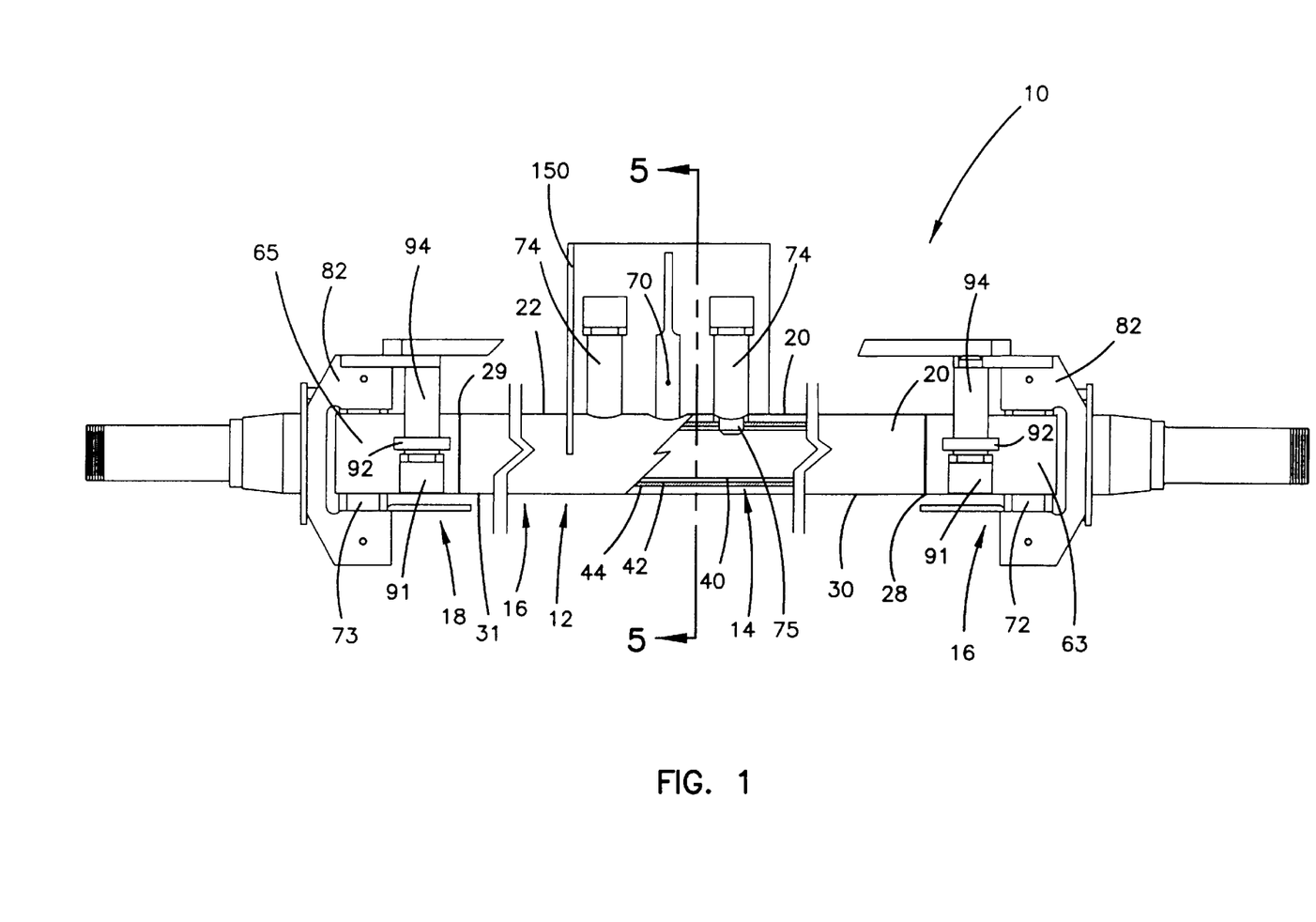
FIG. 1 is a front, partial cut away view of a preferred adjustable steering axle according to the principles of the present invention.
Figure 2:
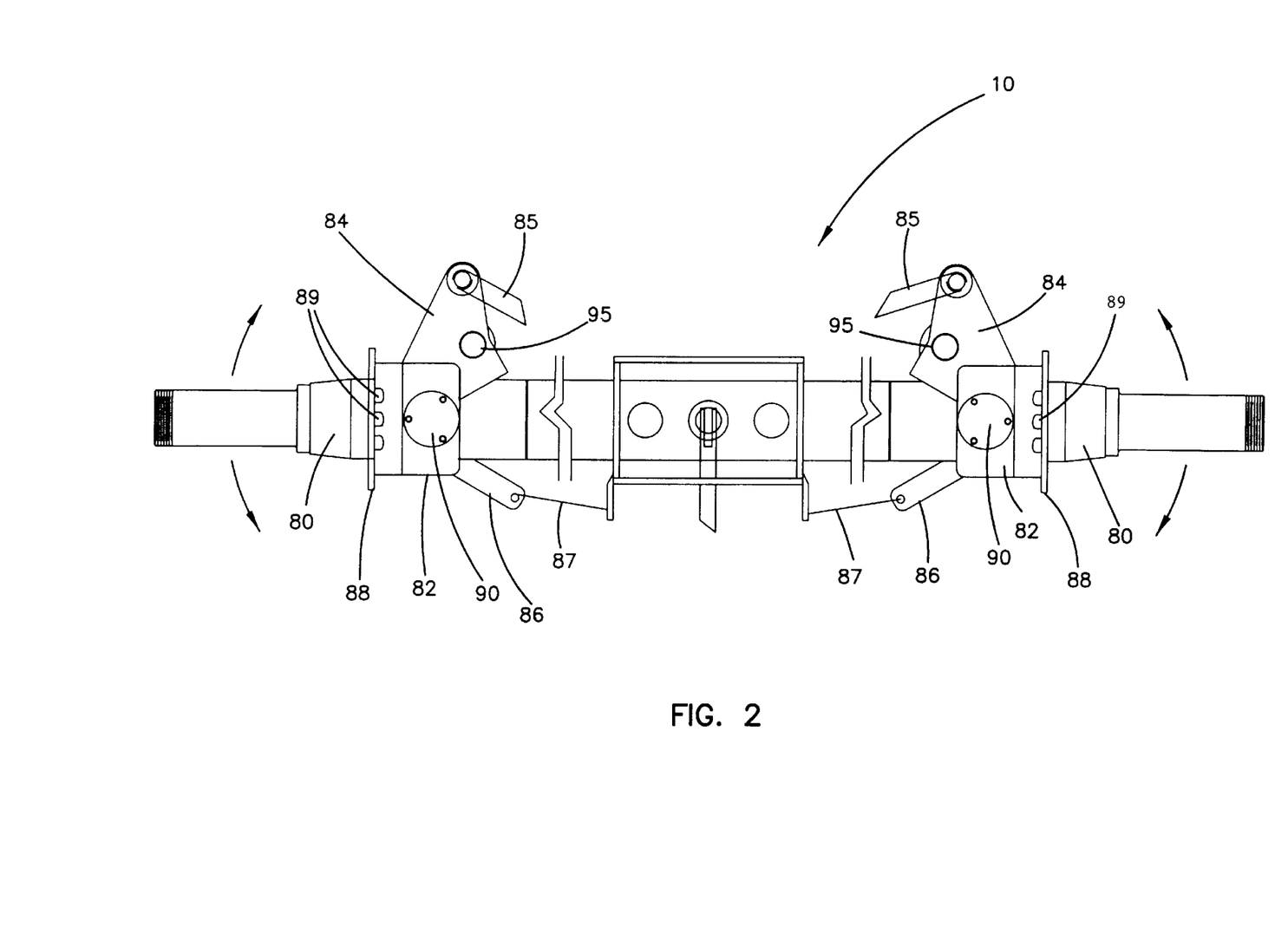
FIG. 2 is a top view of the adjustable steering axle of FIG. 1.

Referring to FIGS. 1 and 2, a preferred embodiment of the adjustable steering axle according to the present invention is provided at reference numeral 10. For convenience, the adjustable steering axle 10 of the invention may be referred to herein as the steering axle or the axle. The steering axle 10 includes four general assemblies. These assemblies can be referred to as the outer axle assembly 12, the inner axle assembly 14, the first spindle assembly 16, and the second spindle assembly 18. As described in more detail below, the interaction between these four general assemblies allows the steering axle to adjust between a positive caster position and a negative caster position, and allows the wheels provided on the axle to turn. Each of these four general regions is discussed in turn below.

The Outer Axle Assembly

The outer axle assembly 12 is provided with an outer axle tube 20. The outer axle tube 20 includes a fixed portion 22 which ends at separation lines 28 and 29. The fixed portion 22 attaches to the vehicle so that it remains in a relatively fixed position relative to the vehicle chassis. That is, the fixed portion 22 attaches via a suspension system to the vehicle frame at locations 30 and 31.

Figure 3:
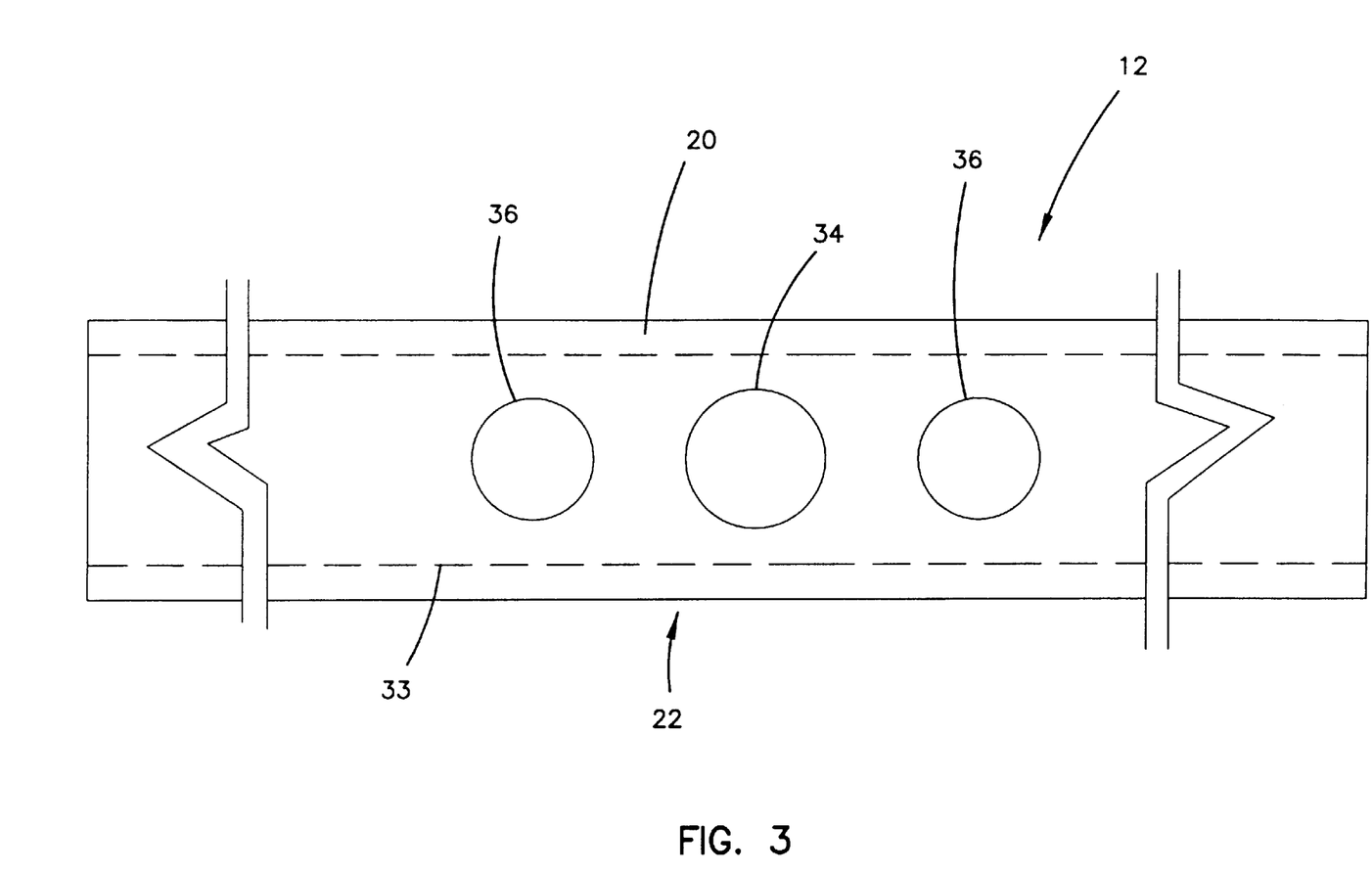
FIG. 3 is a top view of the outer axle tube of the adjustable steering axle of FIG. 1.

Referring now to FIG. 3, a top view of the outer axle tube 20 is provided. The outer axle tube 20 includes an interior cylindrical surface 33 and several openings or apertures which allow components of the axle to pass therethrough. The apertures shown include the caster change pin slot 34 and the lockpin slots 36.

The Inner Axle Assembly

Figure 4:
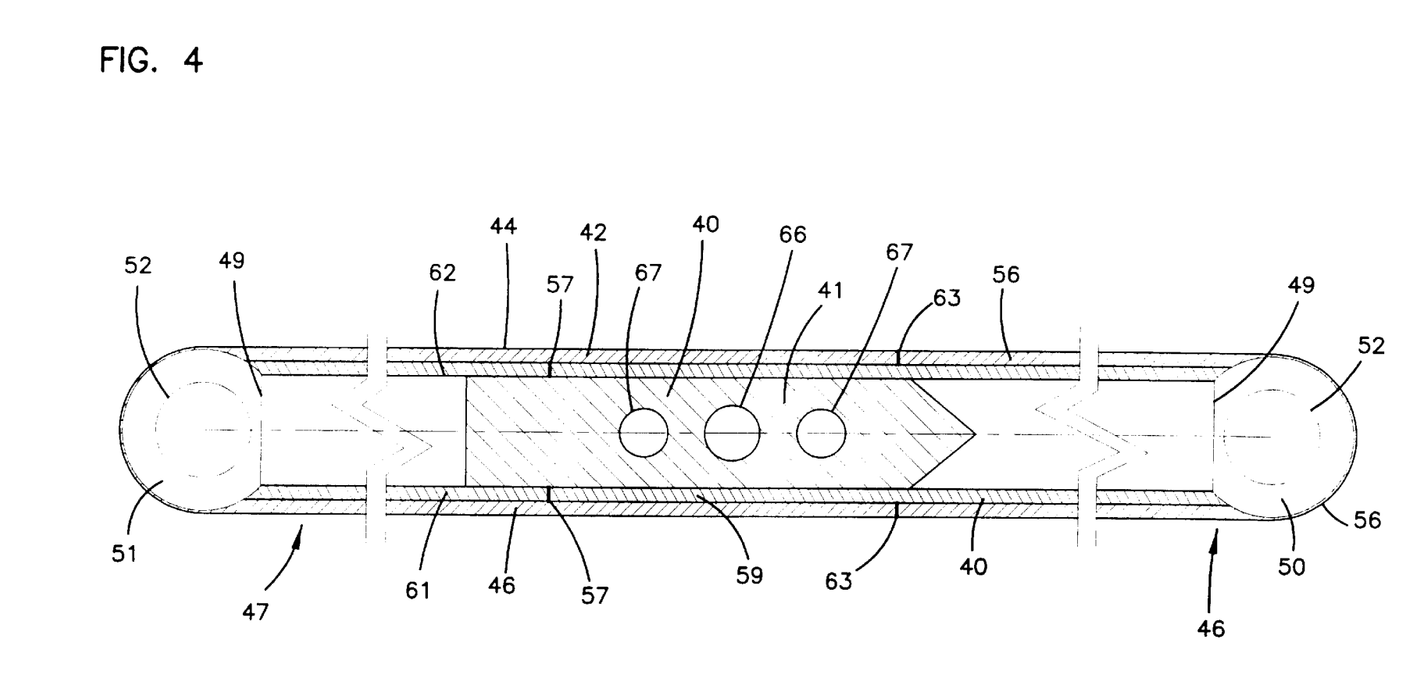
FIG. 4 is a top view of the inner axle of the adjustable steering axle of FIG. 1.

The inner axle assembly 14 includes an inner axle 40 and a bearing structure 42 having a bearing surface 44. The inner axle 40 includes a first end 46 and a second end 47. As shown in FIG. 4, the first and second kingpin receiving tubes 50 and 51 are attached at the first and second ends 46 and 47 of the inner axle 40, respectively. Preferably, the attachment at points 49 is by welding. The kingpin receiving tubes 50 and 51 include openings 52 for receiving the kingpins as described in detail below. The combination of the inner axle 40 and the bearing structure 42 are provided with an outside diameter which will fit within the outer axle tube 20 so that the bearing surface 44 contacts and moves relative to the interior cylindrical surface 33. The inner axle assembly 14 is rotatably mounted within the outer axle assembly 12.

Referring now to FIG. 4, a top view of the combination of the inner axle 40 and bearing structure 42 is provided. The bearing structure 42 is preferably a filament winding 56 which is capable of withstanding the shear stresses associated with its position in the adjustable steering axle 10. The filament winding 56 is shown wrapped around the entire length of the inner axle 40 and additionally around the kingpin receiving tubes 50 and 51 to provide further structural support in attaching the kingpin receiving tubes 50 and 51 to the inner axle 40. Applicants have found that by providing the filament winding around the kingpin receiving tubes 50 and 51, the overall structural integrity of the entire inner axle assembly 14 is enhanced. It should be appreciated that the thickness of the filament winding 56 provided along the length of the inner axle is sufficient to provide a bearing surface. In contrast, the thickness of the filament winding 56 around the kingpin receiving tubes 50 and 51 is of a sufficient thickness to enhance structural integrity. These thicknesses may be different.

The inner axle 40 is provided as a tube structure and includes a support structure 41 inside the tube at least at the location where the tube receives the caster change pin and the caster lock pins.

The inner axle assembly 14 is manufactured by first providing an inner axle 40 of desired length. The inner axle 40 is cut at location 57 to provide first axle portion 59 and second axle portion 61. The support structure 41 is then inserted into the second axle portion 61 and welded to the interior surface 62 thereof. The axle portions 59 and 61 are then reassembled and the support structure 41 is not welded to the first axle portion 59.

Once the inner axle 40 is reassembled, it is filament wound to provide the filament winding 56. Preferably, the filament winding is overwound thereby requiring machining of the filament winding 56 to provide the desired outer diameter. In preferred embodiments, the outer diameter clearance between the filament winding and the surface 33 is less than about 3/1000 inch. More preferably, the clearance is less than about 5/1000 inch. After the grinding is completed, the filament winding is cut at location 63. Then the first portion 59 and the second portion 61 are separated. Once the two portions are separated, alignment pins are inserted at location 63 in order to properly realign both portions 59 and 61. The splitting of the portions 59 and 61 is accomplished in order to allow them to be reassembled inside the outer axle assembly 12. This is accomplished by sliding each portion into an opposite end of the outer axle assembly 12 and allowing the portions to mate inside the outer axle assembly via the alignment pins.

Prior to the reassembly of the portions 59 and 61, the first and second collars 63 and 65 are placed over the respective portions of the inner axle and kingpin receiving tubes. The collars 63 and 65 are then welded to kingpin receiving tubes 50 and 51.

The combination of the inner axle 40 and the bearing structure 42 is provided with apertures or slots which provide interaction with other components of the axle. The apertures shown include the caster change pin slot 66 and the caster lockpin slots 67. The caster change pin slot 66 is threaded to receive the threaded portion 68 of the caster change pin 70 as shown in FIG. 5.

The first kingpin 72 passes through the opening 52 of the first kingpin receiving tube 50. Similarly the second kingpin 73 passes through the opening 52 of the second kingpin receiving tube 51.

Caster change lock pins 74 are provided for engaging the openings 67 for locking the inner axle assembly 14 in place relative to the outer axle assembly 12. As shown, the caster change lock pins 74 are provided with arms 75 which pass thought the lockpin slots 36 in the outer axle tube 20.

Figure 5:
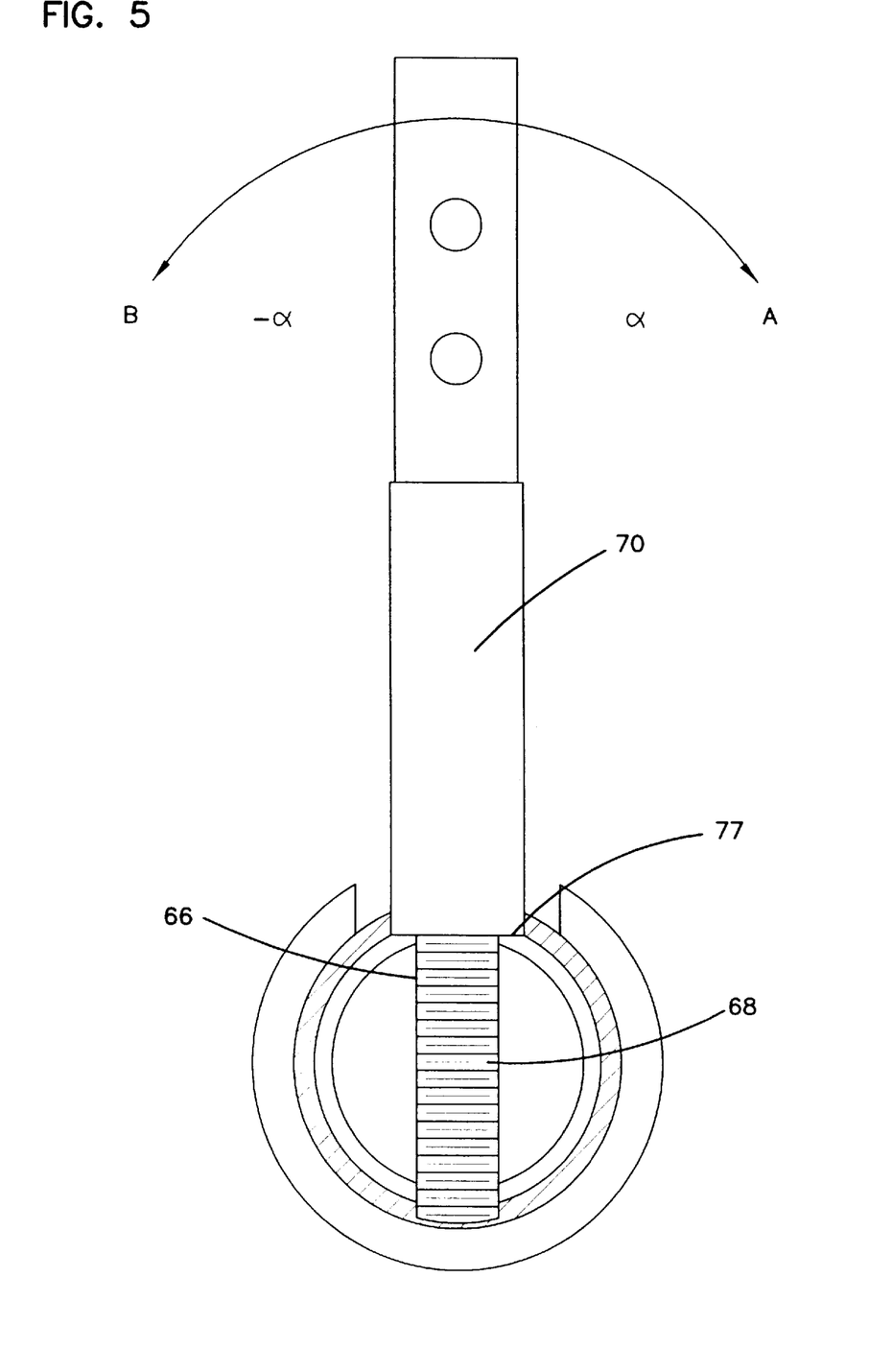
FIG. 5 is sectional view taken along line 5—5 of FIG. 1 showing the interaction between the inner axle assembly, the outer axle assembly, and the caster change pin.

As shown in FIG. 5, the caster change pin 70 can be rotated through angle α. In directions A or B, the angle α is preferably less than about 7 degrees to provide the desired caster. More preferably, the angle α is between about 2 and 6 degrees. Of course, it should be understood that the extent of rotation is determined by the angle of rotation of the kingpins 72 and 73. In the embodiment shown in FIG. 5, it is understood that the angle of rotation of the caster change pin 70 will be equivalent to the angle of rotation of the kingpins 72 and 73. The caster change pin 70 is machined as a shoulder bolt 77 where it meets the inner axle 40 to provide additional support at that location. It should be appreciated that the caster change pin 70 can be manufactured from steel. It is expected that it can additionally be manufactured from other materials including a combination of steel and filament winding.

The First and Second Spindle Assemblies

The steering axle 10 includes first and second spindle assemblies 16 and 18. As shown in FIGS. 1 and 2, the first and second spindle assemblies 16 and 18 are essentially mirror images. It should be understood that the two assemblies need not be mirror images. It is just that for this preferred embodiment, they happen to have fairly similar structures. As a result, the following discussion at times adopts common reference numerals for designating similar structures between the two assemblies.

The spindle assemblies include spindles 80 which are mounted to C blocks 82. Preferably, the spindles 80 are welded to the C blocks 82. The C blocks 82 are then attached via the kingpins 72 and 73 to the inner axle assembly 14. The kingpins 72 and 73 extend through the kingpin receiving tubes 50 and 51 and connect to the C blocks 82. The C block 82 is provided with its name because of its general C shape. That is, it is an axle fork which pivots about the kingpin receiving tube and is held in place by the kingpin.

Figure 7:
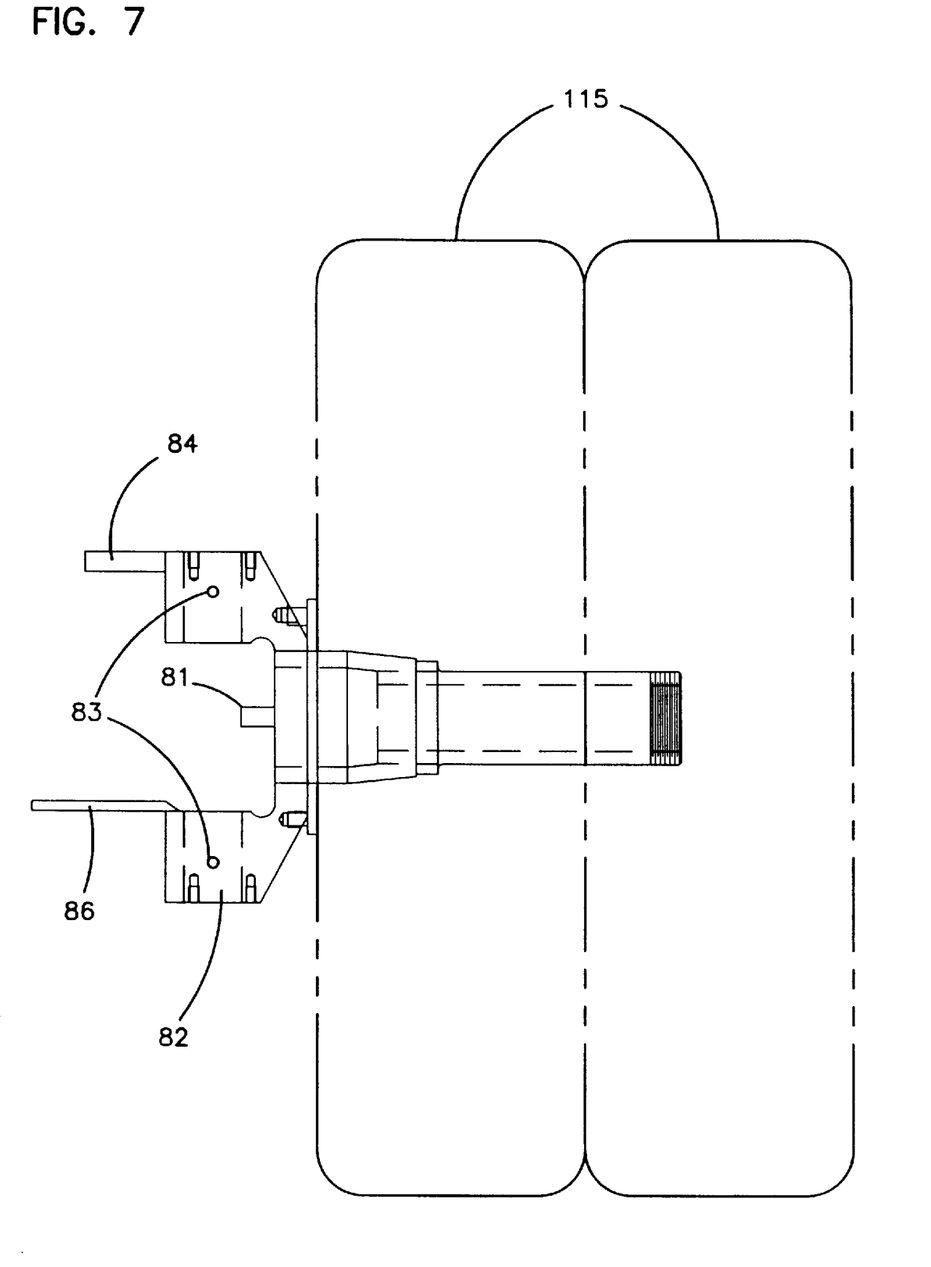
FIG. 7 is a side view of the spindle assembly with tires in outline.

FIG. 7 shows a side view of the C block 82 which includes greasezerks 83 which provides for greasing the kingpin. Additionally shown is stop 81 which limits the rotation of the C block 82. In most applications it is expected that the C block will not rotate more than 35 degrees. Additionally shown are tires 115 in outline.

The spindle assemblies 16 and 18 include a tie rod arms 84 provided to rotate about the kingpins. The tie rod arms 84 are structured to provide the desired steering geometry for the axle. As shown by the arrows in FIG. 2, the spindles are allowed to move forward or backward about the kingpin in order to provide steering. The tie rod arms 84 include the tie rods 85 which are connected together so the spindle assemblies pivot in unison. The concept of utilizing tie rod arms and tie rods to provide for steering is discussed by B. Elliott and E. Consoliver, "The Gasoline Automobile," Fifth Edition, published by McGraw-Helm Book Company, Inc., 1939, pages 540–542, the disclosure of which is incorporated by reference.

The spring bracket 86 is rigidly attached to the C block 82. The spring 87 is attached to the spring bracket 86 so that the spindle assemblies resist movement. The springs 87 are anchored to the outer axle assembly 12. More particularly, the springs are provided so that the wheels will not turn unless a minimal tire side force is applied creating a breakout force. The desired magnitude of the breakout force can be varied for a given application. That is, for lighter loads, the break out force can be less than may be desired for trailers carrying heavier loads. It is expected that for semi-trailer application carrying standard loads, the breakout force should be at least about 1,000 lbs force for an axle of nominal 20,000 lb capacity. The breakout force can be defined as the spring force moment arm multiplied by the tire side force and divided by the spring force moment arm. The precise definitions of these terms can be obtained from the University of Michigan Transportation Research Institute' scourse on heavy vehicle dynamics.

As shown in FIG. 2, the spindle assemblies additionally include a brake adapter ring 88 which is provided for allowing brake assemblies to bolt up to it. As further shown, bolts 89 are provided for mounting the brake adapter 88 ring to the C block 82 or axle fork. A dust cap 90 is shown over the kingpin in order to prevent debris from entering the kingpin receiving tube.

Figure 6:
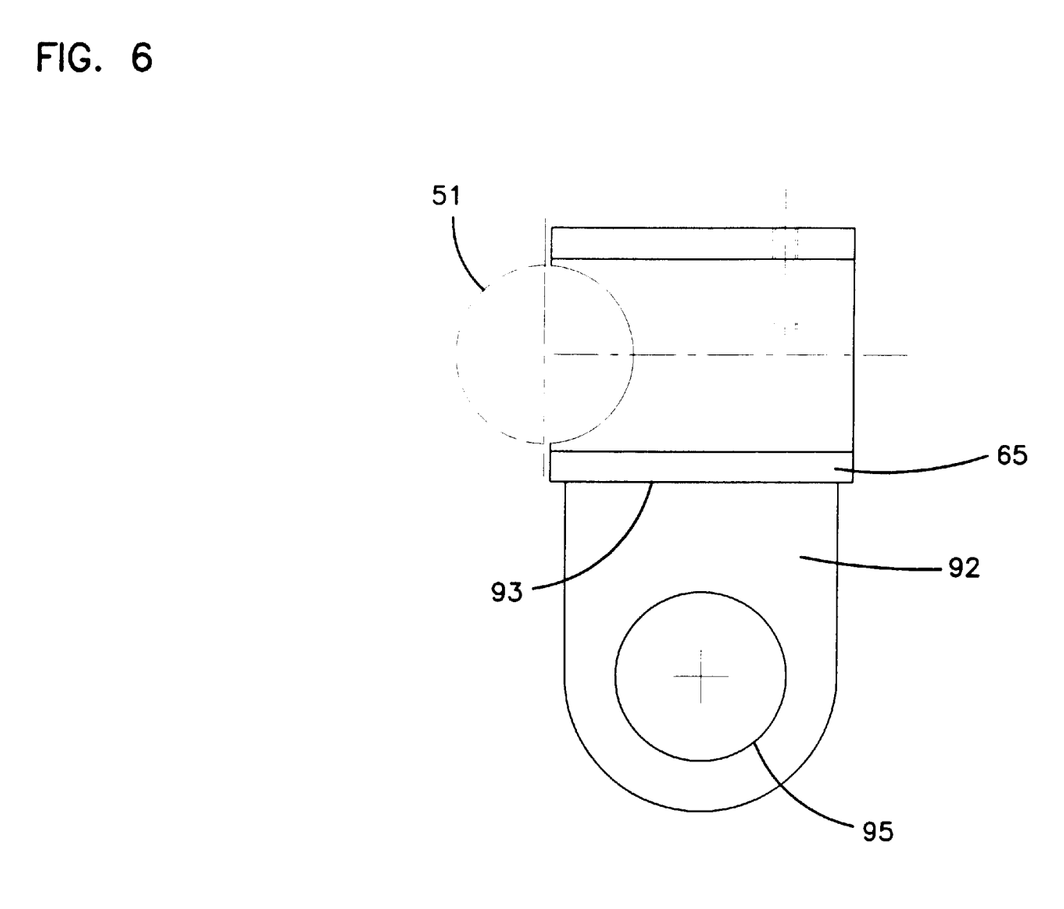
FIG. 6 is an enlarged view of the collar and tie rod/lock pin mounting bracket.

The tie rod lock pin 91 is shown passing through the tie rod/lock pin mounting bracket 92. It is the tie rod/lock pin mounting bracket 92 which keeps the tie rod lock pin 91 in position adjacent to the collar. The tie rod/lock pin mounting bracket 92 is welded to the collar 65 at location 93 as shown in FIG. 6. As shown in FIG. 1, the tie rod lock pin 91 is provided in the closed position. The actuator arm 94 has engaged the tie rod arm through tie rod opening 95. When the tie rod lock pin 91 is engaged, the actuator arm 94 recedes out of the tie rod opening 95 and releases the tie rod arm 84.

Operation

Rotation of the inner axle assembly 14 is accomplished by operation of the caster change pin 40. Now referring to FIG. 5, the caster change pin 70 rotates in positive and negative directions as indicated by arrows A and B, respectively. The caster change pin 70 is fixed to the inner axle tube 40. The attachment must be secure enough to permit the caster change pin 40 to rotate the inner axle assembly 14.

The caster change pin 70 is not attached to the outer axle assembly 12. As shown, the caster change pin 70 passes through an aperture or slot 34 which allows the caster change pin 70 to move in positive and negative directions. In a preferred embodiment, the caster change pin 70 is threaded into the inner axle assembly 14.

As the caster change pin 70 is actuated in the positive direction, a positive caster position is provided. Similarly, when the caster change pin 70 is actuated in the negative direction, a negative caster position is provided. Thus, as the caster change pin 70 rotates in the positive direction, the inner axle assembly 14 similarly rotates causing the kingpins 72 and 73 to displace positively providing a positive caster change angle α. When the caster change pin 70 is actuated in the negative direction, the kingpins 72 and 73 then rotate through angle-α to provide a negative caster position.

The caster change pin 70 can be actuated by any common means including, pneumatic actuation, electric actuation, hydraulic actuation, and manual operation. Preferably, the caster change pin is actuated pneumatically.

When the caster angle is positive, the wheels tend to follow in a forward direction. Similarly, when the caster angle is negative the wheels lead in the rearward direction. In the preferred embodiment of the present invention, the caster angle is adjustable between 2 and 7 degrees in both the positive and negative directions. While 6 degrees is a preferred angle for forward movement and −6 degrees is a preferred angle for rearward. When the vehicle incorporating the adjustable steering axle of the invention is moving along the highway in a forward direction, it is expected that the caster angle will be positive. Locking the caster angle in a positive direction for traveling down the highway helps reduce shimmy and provides a more stable ride. Furthermore, it should be understood that when traveling down the highway at high speeds, the tie rods will be locked in place. Thus, the combination of a positive caster angle, the tie rods being locked in place, and the force generated by the springs which provide a breakout force will, in their totality, enhance riding stability at higher speeds.

It is an advantage of the present invention that the swept area of a vehicle for negotiating a turn can be reduced. It is preferable that the swept area is reduced at least about 25% when negotiating a right-hand turn. This is accomplished by moving the pivot point forward. In the case of a spread axle (10 ft. 1 in.) configuration wherein the forward axle is a fixed axle and the rearward axle is the adjustable steering axle of the invention, the pivot point moves to the middle of the fixed axle. The enhanced maneuverability is observed when traveling in the rearward direction. In fact, maneuverability is often more important when traveling in the reverse direction because a significant proportion of property damage to trailers happens while backing up.

Caster change lock pins 74 are provided for engaging the outer axle assembly 12 and the inner axle assembly 14. The tie rod lock pins 91 are provided for engaging the tie rod arms 84 to prevent the spindle assemblies from turning. It is an advantage of the invention that the caster change lock pins 74 and the tie rod lock pins 91 can be provided as identical structures. The lock pins 74 include a plunger or arm 75 which actuates between open and closed positions. When the caster lock pins 74 are engaged, the caster angle is positive. The plungers 75 then recede and the caster can move to a negative angle. When the plungers 75 for the caster change lock pins 74 are provided in an open position, the inner axle assembly 14 is permitted to rotate relative to the outer axle assembly 12. When the plunger passes through locking apertures 67, the inner axle assembly 14 is fixed within the outer axle assembly 12. When the tie rod lock pins plungers (not shown) are provided in the open position, the spindle assemblies are permitted to turn. When the plungers engage the tie rod lock pin holes, the tie rod arms 84 are locked into position.

Figure 9:
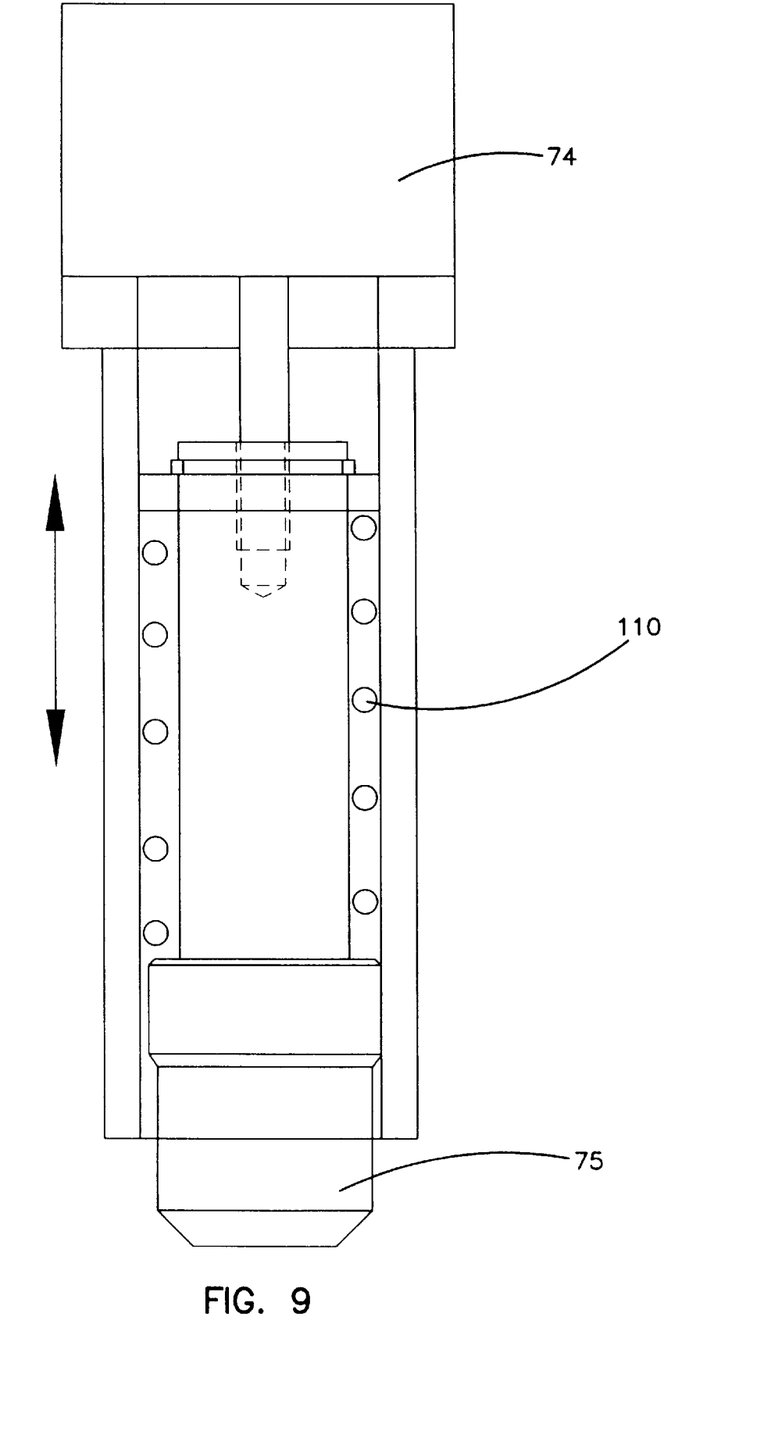
FIG. 9 is an enlarged view of a locking pin.

Now referring to FIG. 9, an enlarged view of the caster change lock pin 74 is provided. A spring 110 is shown which forces the plunger or arm 75 in an extended position. A pneumatic cylinder causes the plunger 75 to retract when it is actuated. As shown in FIG. 9, the caster change lock pin 74 is shown about half way retracted. The movement is provided along the indicated arrow.

Figure 10:
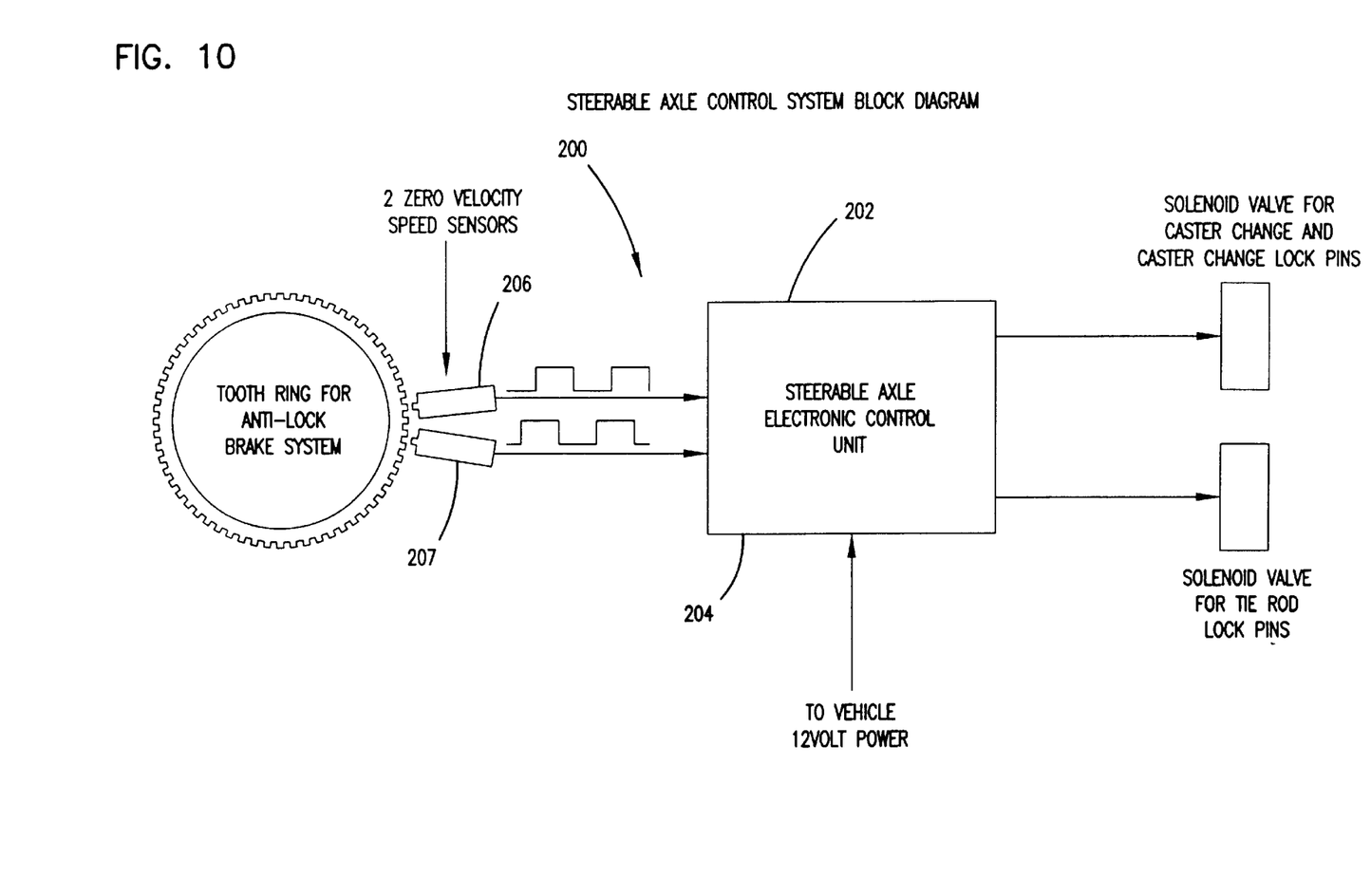
FIG. 10 is a flow chart showing a preferred control system for operating the adjustable steering axle of FIG. 1.

The tie rod lock pins 91 and caster change lock pins 74 can be controlled either manually or automatically. Referring to FIG. 10, a block diagram of a first preferred control system of the present invention is provided at reference numeral 200. The control system 200 is intended to be used on-board the trailer.

The system 200 includes a microprocessor 202 having a central processing unit (CPU) 204. The CPU 204 receives signals from sensors on the trailer. Preferably, the sensors include at least two zero velocity speed sensors arranged 90 degrees out of phase. One zero velocity speed sensor senses the speed of the vehicle. This is accomplished by sensing the speed of rotation of the tooth ring for the anti-lock braking system. In the event an anti-lock braking system is not provided, a tooth ring can be press fit onto the brake drum. The second zero velocity speed sensor is mounted 90 degrees out of phase with the first velocity speed sensor. This permits the CPU 204 to detect direction of the vehicle. In response to input from the speed sensors 206 and 207, the CPU 204 may cause the caster change lock pin, and steering lock pins to engage or disengage based upon the program prescribed by the CPU. The speed at which the caster lock pins and the steering lock pins engage may vary. For example, the steering lock pins may engage at 20 miles per hour, while the caster lock pin may engage at 3 miles per hour.

In the operation of the control system, there are several control parameters which are expected to be closely monitored. A first parameter is called "Rolldist" and is the number of wheel pulsar ticks that count after a direction change, but before initiating a change of caster angle. Another parameter is "Lockspeed" which is the speed at which the lock pins are engaged. This speed is expressed in speed pulsar ticks per second. Another parameter of importance is called "Unlockspeed" which is the speed at which the lock pins are disengaged. This speed is expressed in pulsar ticks per second. A further parameter of importance is called "Decellimit" and is the deceleration threshold to allow lock pin disengagement. When the speed drops below the unlocked speed, the deceleration rate must be below this speed to allow the lock pins to disengage. This rate is expressed as the change of speed pulsar ticks from 1 second to the next.

A preferred controller for use in the system of the invention is a Blue Earth research, XPLOR-32 Micro-Controller to zero velocity magnetic pick-ups are used to determine velocity and direction. Field effective transistors are used to drive the solenoid valves.

It is expected that self diagnostic capabilities will be added to the control system. It is expected that a blinking LED visible on the outside of the control module will be used to indicate normal operation or flash codes to indicate any detectable faults. A steady flash rate could indicate normal function and different flash patterns could be used to indicate the different system faults that can be detected by the control circuit. Another type of controller which can be used in the invention includes the 8051 family micro controller.

The CPU can also control the caster change. When the direction sensor detects a change in direction, for example from forward to reverse, the caster angle may be changed from positive to negative.

In alternate embodiments, the caster change lock and steering lock functions may be controlled through a connection with the tractor. The tractor may include the sensors necessary to actuate the identified functions of the present invention. The functions may be provided as part of an anti-lock brake function which is being included on many trucks currently manufactured.

A pneumatic system may also control the caster adjustment. The pneumatic system includes an interface operatively connected to the tractor. The interface engages the tractor at tractor cord. This system controls the actuation of the lock pins which would lock inner axle assembly to outer axle assembly to prevent inadvertent caster shift and lock the steering axle in position to prevent turning. The system also controls the caster change pin which shifts the caster between positive and negative positioning.

The system may also include a plurality of warning lights which gives the operator of the tractor an indication of the status of the trailer's steerable axle system. In particular, the operator is informed of positive or negative caster with a forward direction light and reverse direction light, and whether the lockingpins are actuated with lock lights. In the first preferred embodiment, the lock pins may be actuated in response to a manual switch or when the speed of the tractor and trailer reaches a predetermined limit for example, 20 miles per hours as indicated by a separate speed sensor (not separately shown). It is understood that various applications may dictate that the speed at which the pins automatically adjust is lower.

Preferred Components

The adjustable steering axle 10 is preferably prepared from components which are capable of withstanding the stresses associated with functioning as an axle for a semi tractor trailer. This means that the materials should be sufficient to withstand cracking under normal operating conditions for the commercial life of the axle. Applicants have found that the outer axle tube 20 and the inner axle tube 26 are preferably steel tubes made from, for example, cold roll steel. In the case of the outer axle tube, preferably has a 5 inch outer diameter and a 4 inch inner diameter. The inner axle tube 40 preferably has a 3½ inch outer diameter and a 2 inch inner diameter. In order to compensate for the separation between the outer diameter of the inner tube 40 and the inner diameter of the outer tube 20, a filament winding 56 is preferably provided around the inner axle tube 40. Preferably, the filament winding is provided with a thickness of between about ¼ inch and ⅜ inch. Generally, the fit between the combination of the inner axle tube 26, the filament winding 60, and the outer axle tube 20 should be as tight as possible. Applicants have found that by providing a tight fit, it is possible to withstand the stresses associated with functioning as an axle for a semi tractor trailer.

In the preferred embodiment of the present invention, the inner axle is provided with a filament winding to add strength and durability. In addition, by incorporating a filament winding, applicants have been able to avoid the use of bushings or other bearings. One should appreciate that if bushings or bearings were to be used in the present invention, the bushings or bearings would have to be provided almost the entire length of the inner axle in order to provide structural support, and would result in an increased thickness or diameter of the axle which would exceed a 5 inch diameter. A 5 inch diameter is the size of a conventional axle tube. Advantageously, the adjustable steering axle of the invention can be used as a substitute or in place of an existing fixed axle on conventional vehicles and utilizing conventional suspension systems on vehicles.

The filament winding is preferably a composite. The type of composite used for filament winding can be epoxy coated fiberglass. The reinforcing fibers used on the inner axle can include carbon. These fibers have strengths which far exceed the strength of steel on a weight basis. Advantageously, the composite provides the inner axle with a self-lubricating affect. In other preferred embodiments the lubricity of the composites may be increased by the addition of selective additives to the composite composition, such as Teflon powder.

The filament can be applied to the inner axle tube by the well known filament winding process. Conventional filament winding processes are described in various articles including B.E. Spencer, "Application of the Filament Winding Process" ASM International, SAN:204–7586, copyright 1986 ASM International, and B.E. Spencer, "Filament Winding as a Low Cost Manufacturing Process: Tricks of the Trade," Society of Manufacturing Engineers, EM:93–107, copyright 1993. The processes described by these articles are incorporated herein by reference.

In addition, the coating provided on the filaments are preferably a thermoset polymer composition. Exemplary types of thermoset compositions would be polymers which form epoxy novolac resins, polyamide resins, bismaleamide resins, and phenolic resins. In general, thermoset resins which provide a hard surface and corrosion resistance are preferred.

Generally, filament winding is a computer controlled process which accurately places the epoxy coated fibers onto the work piece. Different angles for the winding may be chosen which will affect the material properties of the finished part. In the first preferred embodiment the fibers provide a strong surface that transfers bearing loads from the outer axle to the inner axle while allowing each axle tube to rotate in relation to each other during the caster change operation. The most advantageous angle for the fibers to provide this characteristic is to have the fibers wound in the hoop direction. Once the fibers have been wound on their inner axle tube the composite is oven cured. The outer surface of the composite is then machined to provide the proper fit between the inner and outer axle tube assemblies. The machining operation permits the inner axle and the outer axle to be closely fitted to one another. Preferably the reinforcing fibers are non-corrosive which means that they will not rust or oxidize.

The caster change pin and the caster lock pins may be housed in a protective shield 150. The protective shield 150 prevents road dirt and other debris from interfering with the relative rotation between the inner and outer axles and affecting the operation of the caster change axle.

In an alternate embodiment, the caster change may be done with a bell crank assembly. A bell crank assembly is discussed fully in U.S. Pat. No. 5,474,320 previously incorporated by reference. A linear actuator may also be used.

It should be appreciated that the adjustable steering axle of the present invention has applications beyond semi tractor trailers. The adjustable steering axle of the present invention may be used in a wide variety of situations where it is desired to improve the turning radius of a vehicle. For example, the adjustable steering axle of the present invention may be used in place of the rear axle on a bus or other large vehicle. The adjustable steering axle can find particular advantageous use with a drop deck trailer where the clearance between the deck and ground is severely limited. Furthermore, the adjustable steering axle can be used in conjunction with the standard suspension provided on most commercially available drop deck trailers.

Figure 8:
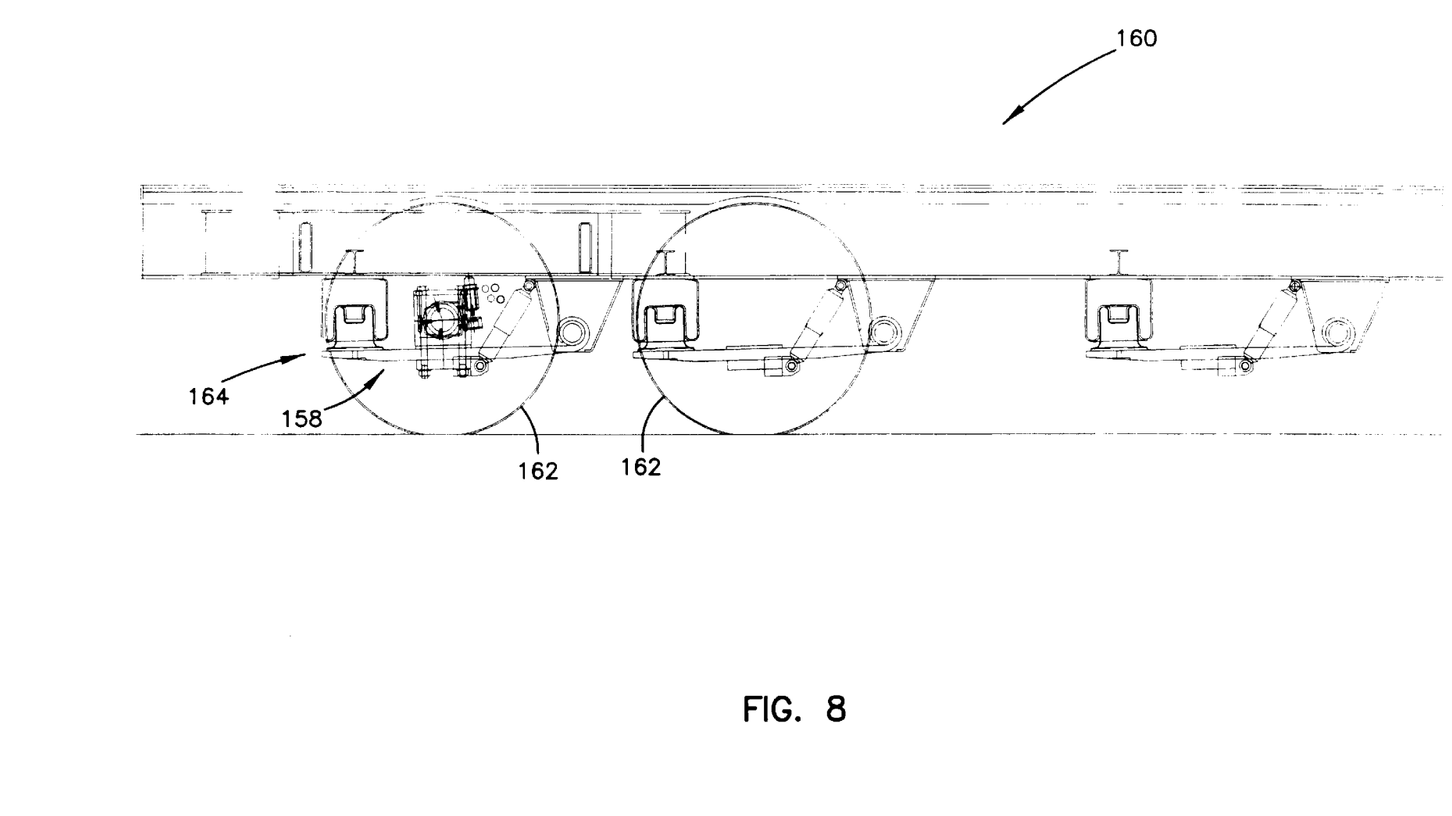
FIG. 8 is a partial, cutaway side view of a trailer having a close tandem arrangement (and a spread axle configuration superimposed) and incorporating the adjustable steering axle of FIG. 1.

Referring to FIG. 8, there is shown the axle 158 of the present invention in use with a drop deck trailer 160 showing a closed tandem configuration and including, for illustration, the placement of a spread axle (10'1") configuration. Tires 162 are provided in outline. It can be seen that the axle 158 can be attached to the suspension system 164 under the drop deck trailer. This is advantageous because of the tight space restrictions under a drop deck trailer. In addition, this Figure demonstrates that a conventional closed tandem configuration can be modified to a spread axle configuration by incorporating the axle of the present invention. The modification is expected to provide better weight distribution, a more stable platform, and a decrease in swept area when turning. In another embodiment, a third axle can be provided forward of the fixed axle in a spread axle configuration, wherein that third axle is an adjustable steering axle according to the present invention. It is expected that this forward adjustable steering axle would similarly provide better weight distribution. More advantageously, however, it will allow the trucking industry to increase the load.

It is to be understood that the present embodiments may be modified and still fall within the scope of the present invention.

EXAMPLE

In order to demonstrate the effectiveness of the steering axle of the invention, a course was created with a grid showing a typical type right hand turn with a curve, designated with a cone and flag, and a path for the tractor to follow which lies 20 feet from the curb on the approach and 30 feet from the curb on the egress. The trailer used for this test was a 48' drop deck with an 18" kingpin setting. The test trailer first negotiated the turn with the rear axle locked out; then went through the course with the steering axle engaged. A 48' dry van with a standard 36" kingpin setting through the same course following the same tractor path. The dry van and the spread axle trailer having two fixed axles showed approximately the same swept area when maneuvering the course.

The adjustable steering axle reduces the swept area of the trailer's turning radius up to 25%. The key is that the pivot point of the trailer is the front fixed axle of a trailer in a 10'1" spread axle configuration; and with a rear steering axle in place, the rear wheels simply follow along, which allows the stationary front axle wheels to rotate around the turn. This ability to turn in a tighter radius makes it easier to operate in areas where narrow streets make negotiating turns and maneuvering around parked vehicles difficult. In addition, the steering axle greatly reduces the tire scuffing normally associated with fixed spread axles.

Figure 11:
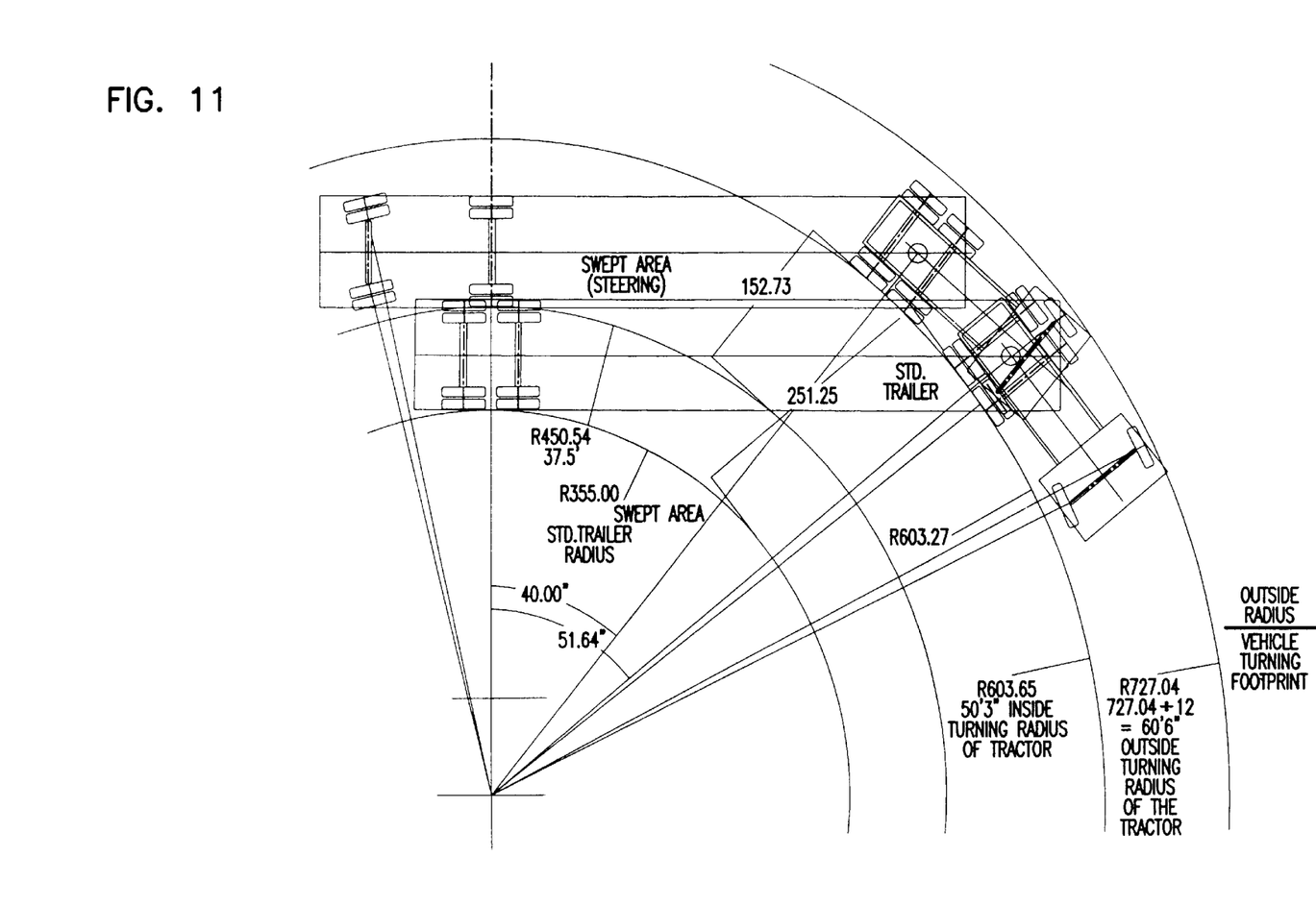
FIG. 11 is a graphic representation demonstrating swept areas.

Now referring to FIG. 11, a graphic representation is provided showing the swept areas for semi-tractor trailers traveling in the same track. One tractor trailer includes a closed tandem fixed axle configuration. The other tractor trailer includes a spread axle (10'1") configuration where the last axle is the adjustable steering axle according to the present invention. As shown by this graphic representation, the swept area for the second tractor trailer is significantly reduced compared with the swept area of the first tractor trailer.

We claim:
1. An adjustable steering axle for a vehicle comprising:
   outer axle having an exterior surface and an inner cylindrical surface;
   inner axle having an outer cylindrical surface, a first kingpin receiving tube provided at a first end of the inner axle, and a second kingpin receiving tube provided at a second end of the inner axle, the inner axle being rotatably received within the inner cylindrical surface of the outer axle;
   first kingpin extending through the first kingpin receiving tube;
   second kingpin extending through the second kingpin receiving tube;
   first spindle rotatable about the first kingpin and having a surface for attaching a wheel;
   second spindle rotatable about the second kingpin and having a surface for rotatably attaching a wheel; and
   caster change pin attached to the inner axle and extending through an aperture in the outer axle, said caster change pin being adjustable to provide rotation of the inner axle relative to the outer axle.

2. An adjustable steering axle according to claim 1, wherein the inner axle having an outer cylindrical surface comprises a cylindrical tube having an exterior surface and filament wound about the exterior surface.

3. An adjustable steering axle according to claim 1, wherein the wound filament provided on the exterior surface of the cylindrical tube of between about ⅛ inch and ½ inch.

4. An adjustable steering axle according to claim 3, wherein the wound filament comprises cured epoxy coated fiberglass.

5. An adjustable steering axle according to claim 2, wherein the cylindrical tube and wound filament is machined to provide an outside diameter which is within about 5/1000 inch of an inside diameter of the inner cylindrical surface of the outer axle.

6. An adjustable steering axle according to claim 1, wherein said caster change pin is adjustable to provide a total angle of rotation of said kingpins of between about 1 and about 15 degrees.

7. An adjustable steering axle according to claim 1, further comprising a caster lock pin.

8. An adjustable steering axle according to claim 1, further comprising a spring assembly which prevent rotation of said spindles at a breakout force of less than about 1,000 pounds force.

9. An adjustable steering axle according to claim 1, further comprising a tie rod assembly which coordinates movement of said spindles.

10. An adjustable steering axle according to claim 9, wherein said tie rod assembly is loaded in position at speeds in excess of 35 miles per hour.

11. An adjustable steering axle according to claim 9, wherein said is tie rod assembly automatically locks into position when traveling above a given set point speed.

12. An adjustable steering axle according to claim 1, wherein the caster change pin automatically adjusts said kingpins into a negative caster position when moving in the rearward direction.

13. A vehicle comprising:

frame;

suspension; and adjustable steering axle comprising outer axle having an exterior surface and an inner cylindrical surface;

inner axle having an outer cylindrical surface, a first kingpin receiving tube provided at a first end of the inner axle, and a second kingpin receiving tube provided at a second end of the inner axle, the inner axle being rotatably received within the inner cylindrical surface of the outer axle;

first kingpin extending through the first kingpin receiving tube;

second kingpin extending through the second kingpin receiving tube;

first spindle rotatable about the first kingpin and having a surface for attaching a wheel;

second spindle rotatable about the second kingpin and having a surface for rotatably attaching a wheel; and caster change pin attached to the inner axle and extending through an aperture in the outer axle, said caster change pin being adjustable to provide rotation of the inner axle relative to the outer axle.

14. A vehicle according to claim 13, wherein the vehicle is a trailer having a spread axle configuration.

15. A vehicle according to claim 14, wherein said trailer having a spread axle configuration has been modified from a trailer having a closed tandem axle configuration.

16. A method for operating a trailer having an adjustable steering axle, said method comprising steps of:

(a) pulling a trailer wherein the trailer comprises the adjustable axle according to claim 1.

17. A method for operating a trailer according to claim 16, further comprising step of:

(a) parking said trailer in a reverse direction.

18. A method for assembling an adjustable steering axle, said method comprising steps of:

(a) providing an inner axle tube having first and second ends;

(b) winding filament around the inner axle tube to provide a filament wound inner axle tube;

(c) inserting said filament wound inner axle tube into an outer axle tube;

(d) rotatably attaching first and second spindle assemblies to the first and second ends of the inner axle.

* * * * *